(12) United States Patent
Najorka

(10) Patent No.: US 11,863,024 B2
(45) Date of Patent: Jan. 2, 2024

(54) DRIVE DEVICE AND SPIN WINDOW HAVING SAID DRIVE DEVICE

(71) Applicant: Hema Maschinen-Und Apparateschutz Gmbh, Seligenstadt (DE)

(72) Inventor: Lars Najorka, Langen (DE)

(73) Assignee: Hema Maschinen-Und Apparateschutz GmbH, Seligenstadt (DE)

( * ) Notice: Subject to any disclaimer, the term of this patent is extended or adjusted under 35 U.S.C. 154(b) by 0 days.

(21) Appl. No.: 16/972,633

(22) PCT Filed: May 16, 2019

(86) PCT No.: PCT/EP2019/062712
§ 371 (c)(1),
(2) Date: Dec. 7, 2020

(87) PCT Pub. No.: WO2019/233732
PCT Pub. Date: Dec. 12, 2019

(65) Prior Publication Data
US 2021/0242743 A1  Aug. 5, 2021

(30) Foreign Application Priority Data

Jun. 5, 2018 (DE) ..................... 10 2018 113 373.1

(51) Int. Cl.
*H02K 1/27* (2022.01)
*H02K 1/2795* (2022.01)
(Continued)

(52) U.S. Cl.
CPC ....... *H02K 1/2795* (2022.01); *B23Q 11/0042* (2013.01); *B23Q 17/00* (2013.01);
(Continued)

(58) Field of Classification Search
CPC ...... H02K 1/182; H02K 3/522; H02K 5/1737; H02K 7/088; H02K 21/24; H02K 2203/03;
(Continued)

(56) References Cited

U.S. PATENT DOCUMENTS 4,900,958 A   2/1990   Kitahara et al.
5,161,055 A   11/1992  Blechschmidt
(Continued)

FOREIGN PATENT DOCUMENTS

DE   202017100300   3/2017
EP   0723328        7/1996
(Continued)

OTHER PUBLICATIONS

Internationaler Recherchenbericht und Schriftlicher Bescheid [International Search Report and the Written Opinion] dated Aug. 20, 2019 From the International Searching Authority Re. Application No. PCT/EP2019/062712 and Its Translation of Search Report Into English. (19 Pages).

*Primary Examiner* — Rashad H Johnson

(57) ABSTRACT

The invention relates to a drive device (1) having an annular stator unit (10), an annular rotor unit (30) and a base plate (50). The stator unit (10) has at least three coils (11) having coil cores (12) and coil bobbins (13). The rotor unit (30) has a bearing unit (31), the coils (11) forming a receiving space (14) in the stator unit (10). According to the invention, the coil cores (12) and the bearing unit (31) stand on the base plate (50). The invention also relates to a spin window (100) having such a drive device (1), a pane (110) being arranged on the rotor unit (30).

13 Claims, 4 Drawing Sheets

(51) Int. Cl.
*B23Q 11/00* (2006.01)
*B23Q 17/00* (2006.01)
*H02K 3/52* (2006.01)
*H02K 5/173* (2006.01)
*H02K 7/08* (2006.01)
*H02K 21/24* (2006.01)

(52) U.S. Cl.
CPC ........... *H02K 3/522* (2013.01); *H02K 5/1737* (2013.01); *H02K 7/088* (2013.01); *H02K 21/24* (2013.01); *H02K 2203/03* (2013.01); *H02K 2203/12* (2013.01)

(58) Field of Classification Search
CPC . H02K 2203/12; B23Q 11/0042; B23Q 17/00
USPC .............. 310/49.22, 49.32, 90, 90.5, 154.05, 310/216.045, 216.001
See application file for complete search history.

(56) References Cited

U.S. PATENT DOCUMENTS

| | | | |
|---|---|---|---|
| 6,081,057 A | 6/2000 | Tanaka et al. | |
| 7,579,726 B2* | 8/2009 | Chen | F04D 25/0646 310/67 R |
| 8,222,782 B2* | 7/2012 | Saito | H02K 7/063 310/68 B |
| 8,836,183 B2* | 9/2014 | Nishino | G11B 19/2009 310/90 |
| 10,033,245 B2* | 7/2018 | Lee | H02K 7/08 |
| 2002/0104909 A1* | 8/2002 | Strutz | H02K 19/103 241/101.2 |
| 2006/0057002 A1* | 3/2006 | Nakanishi | F04D 13/0686 417/423.7 |
| 2006/0255681 A1* | 11/2006 | Chen | F04D 25/0646 310/254.1 |
| 2007/0040462 A1* | 2/2007 | Yamaguchi | H02K 7/061 310/81 |
| 2007/0273238 A1* | 11/2007 | Nomura | H02K 1/187 310/90 |
| 2008/0018187 A1* | 1/2008 | Yamaguchi | H02K 1/182 310/71 |
| 2008/0174212 A1* | 7/2008 | Rudel | H02K 29/08 310/156.43 |
| 2010/0158723 A1* | 6/2010 | Ihle | F04D 13/064 310/194 |
| 2010/0314974 A1* | 12/2010 | Horng | H02K 21/24 310/40 MM |
| 2013/0049551 A1* | 2/2013 | Tamaoka | G11B 19/2009 310/156.01 |
| 2013/0050872 A1* | 2/2013 | Sekii | H02K 1/146 310/71 |
| 2013/0050873 A1* | 2/2013 | Abe | H02K 5/225 310/216.074 |
| 2013/0300234 A1* | 11/2013 | Sekii | H02K 3/522 310/71 |
| 2015/0108861 A1* | 4/2015 | Sekii | H02K 1/146 310/71 |
| 2015/0170701 A1* | 6/2015 | Abe | H02K 1/146 360/99.08 |
| 2017/0250637 A1* | 8/2017 | King | H02P 8/22 |
| 2018/0048208 A1* | 2/2018 | Sekii | H02K 5/22 |
| 2022/0021258 A1* | 1/2022 | Schwamberger | H02K 3/522 |

FOREIGN PATENT DOCUMENTS

| | | |
|---|---|---|
| EP | 2709248 | 3/2014 |
| EP | 3148056 | 3/2017 |
| GB | 868632 | 5/1961 |

\* cited by examiner

DRIVE DEVICE AND SPIN WINDOW HAVING SAID DRIVE DEVICE

RELATED APPLICATIONS

This application is a National Phase of PCT Patent Application No. PCT/EP2019/062712 having International filing date of May 16, 2019, which claims the benefit of priority of German Patent Application No. 10 2018 113 373.1 filed on Jun. 5, 2018. The contents of the above applications are all incorporated by reference as if fully set forth herein in their entirety.

FIELD AND BACKGROUND OF THE INVENTION

The invention relates to a drive device according to the preamble of claim 1.

Spin windows or rotating viewing windows are used on panes or viewing windows where the view is obstructed by precipitation. This can be the case, for example, with machine tools or with viewing windows in the shipping industry. In both scenarios, a large amount of liquid, be it rain, waves or, in the case of machine tools, coolant, is regularly deposited on the viewing window. This obstructs the view through the viewing window.

One way to ensure that it is possible to see through such a viewing window is to install a spin window. Spin windows have a pane that rotates at a high speed. Any liquid or dirt that is deposited on the pane is accelerated by the rotary motion of the pane and moved radially outward by centrifugal force. This quickly clears the pane of precipitation. Any newly occurring precipitation is accordingly quickly transported away from the spin window such that an unobstructed view is made possible through the spin window in operation.

Spin windows therefore generally have a round design and are built into normal viewing windows or machine housings to enable a view in the event of increased precipitation. In the event that there is no precipitation or only little precipitation occurs, viewing windows are usually cleaned using other methods (for example window wipers) because the viewing area through the normal viewing window is larger. When machine tools are used that use coolant, so much precipitation can occur due to coolant, chips and the like that the view through a viewing window is obstructed during operation. In this case, it can be advantageous to provide a spin window in the viewing window or in a machine housing.

In particular in the event of particularly heavy precipitation on the spin window, the centrifugal force provided by the drive device of the window must be sufficient to remove the precipitation. A large amount of precipitation in a short period of time can be considered particularly heavy precipitation. In addition, viscous precipitation or a mixture of a fluid and solid components, such as coolant from machine tools that is mixed with chips, can place high demands on the spin window.

Spin windows are known, for example, from DE 34 144 87 A1 and DE 35 32 362 A1. Various types of drive devices, for example synchronous electric motors, asynchronous motors, pneumatic motors or hydraulic motors, which are arranged in the centre of the spin window, are provided for the drive. The drive devices reduce the field of vision, since they cover a region in the centre of the spin window. In addition, the motors have a certain overall height that obstructs the view through the spin window if the window is viewed at an angle. In addition, the drive devices require a lead that usually extends in the radial direction across the spin window in order to provide the energy required for rotating the pane. Due to the overall height of the drive devices, it has hitherto been difficult or impossible to use spin windows in viewing panes that can be displaced substantially parallel to one another.

Nevertheless, the operation of spin windows having a central drive device has prevailed because the design is structurally favourable and the spin windows having the central motor arrangement have a long service life and are not prone to failure.

SUMMARY OF THE INVENTION

The object of the invention is to improve the drive device in terms of its overall height and energy efficiency and to provide a spin window having such a drive device.

The main features of the invention are given in the characterising part of claim 1. Embodiments are the subject matter of claims 2 to 13.

For a drive device having an annular stator unit, an annular rotor unit and a base plate, the stator unit having at least three coils having coil cores and coil bobbins and the rotor unit having a bearing unit, the coils forming a receiving space in the stator unit, the coil cores and the bearing unit stand on the base plate, according to the invention.

Accordingly, the drive device can in particular be designed as an electric drive device, i.e. as an electric motor. In particular, it is provided that the bearing unit and/or the coil cores stand directly on the base plate. This has the advantage that the overall height of the drive device is particularly low. The arrangement of the bearing unit and the coil cores of the stator unit together on the base plate also has the advantage that the coils or coil cores of the stator unit and the bearing unit or the rotor unit are precisely aligned relative to one another because the base plate and the contact surfaces of the bearing unit and the rotor unit can be manufactured with high precision.

The rotor unit and the stator unit can therefore be arranged at a particularly small distance from one another, as a result of which an even lower overall height and a simultaneous increase in the efficiency of the drive device are achieved. A high torque is thus achieved for the drive device, as a result of which a high torque is provided for heavy, direct coolant bombardment when the drive device is used in a spin window.

When viewed in an axial direction, the coil cores in a preferred embodiment have a shape that tapers radially inwards. In particular, the coil cores are in the shape of a circular ring segment. This results in a particularly space-saving arrangement of the coil cores in the annular stator unit or in the drive device.

According to a further embodiment, the rotor unit is arranged concentrically with respect to the coils in an axial direction and protrudes with the bearing unit at least in part into the receiving space. This nesting of the rotor unit and the stator unit allows the overall height of the drive unit to be further reduced in an advantageous manner.

According to a further embodiment of the invention, the coil bobbins are at least in part arranged on a printed circuit board. In this case, it is preferable for the printed circuit board to rest on the base plate and have a recess. By arranging the coil bobbins on the printed circuit board, coil windings, which can be wound onto the coil bobbins, can be connected particularly easily to open-loop or closed-loop control electronics of the drive unit. The installation space available for the drive unit is optimally utilised in an advantageous manner because the printed circuit board rests on the base plate and in particular because, in a preferred embodiment, the printed circuit board rests directly on the base plate.

According to a further preferred embodiment, the coil cores protrude through the printed circuit board in the region of the recess. This ensures that both the printed circuit board and the coil cores stand directly on the base plate. In a preferred embodiment, an outer circumference defined by the coil cores corresponds to the inner circumference of the recess in the printed circuit board, such that the coil cores are in positive engagement with the printed circuit board. The installation space required for the drive unit is thereby advantageously minimised. According to a further embodiment of the invention, the coil bobbins at least in part project beyond the recess. In particular, the coil bobbins protrude beyond the recess in the radial direction. In this way, the installation space in the drive unit that is available radially inward in the direction of the bearing unit can be used efficiently for the coils of the stator unit.

In a further embodiment, the coil cores are connected in the region of the recess via projections and form at least one coil core element. In yet another embodiment, the coil bobbins may be arranged at least in part above the coil core element. The projections may also rest on the base body and connect the coil cores on the side facing the base body. Furthermore, the projections may rest directly on the base body. The projections may form the outer circumference of the coil core element. In a preferred embodiment, the projections form the outer circumference of the coil core element together with the coil cores. In a further embodiment of the invention, the projections have the same material as the coil cores. In a further embodiment of the invention, the coil core element is designed as one piece or one part. The provision of a corresponding coil core element increases the mechanical stability of the stator. In addition, the efficiency of the drive device is improved by the connected coil cores because efficiency losses that occur due to magnetic reversal or due to eddy currents are reduced by the projections.

In one embodiment of the invention, the printed circuit board has an open-loop and/or closed-loop control circuit. Therefore, in a further structurally favourable embodiment of the invention, the coil bobbins and the open-loop and/or closed-loop control circuit are arranged substantially on one plane. This plane is preferably formed by a side of the base plate. In this way, the open-loop and/or closed-loop control circuit can be arranged particularly close to the coil bobbin and thus also particularly close to the coils. This has a favourable effect with regard to possible line losses between the open-loop and/or closed-loop control circuit and the coils. In addition, the utilisation of the installation space is optimal with regard to a compact drive device.

In an alternative embodiment, the open-loop and/or closed-loop control circuit is arranged on a further printed circuit board. According to this alternative embodiment, the printed circuit board can be arranged flexibly in the drive device, such that there are advantages in terms of flexibility in the spatial configuration of the drive device.

In an advantageous embodiment of the invention, the bearing unit may have a support element. In terms of design, the support element may optionally have a contact region that, on the side of the coils opposite the base plate, extends at least in part over the coils in the radial direction. In a further advantageous embodiment of the invention, at least three permanent magnets are arranged on the support element. In a preferred embodiment, the permanent magnets are in the shape of a circular ring segment. In this way, the permanent magnets may be arranged in a particularly space-saving manner and close to the support element of the annular rotor unit.

The fact that the permanent magnets are arranged on the contact region on a side facing the coils advantageously results in the structure of a disc motor that has a particularly low overall height. In an optional embodiment, the at least three permanent magnets rest in the support element. The invention can be further developed in that a gap is formed between the contact region and the coils in the axial direction. In a particularly advantageous embodiment, the gap between the radially extending contact region is designed to be as small as possible in order to achieve a high degree of efficiency of the drive device and at the same time a reduction in the overall height. In a further embodiment, the gap between the permanent magnets and the sides of the coils facing the permanent magnets is less than 1 mm, preferably less than 0.1 mm. In these embodiments, the gap extends in the radial direction in parallel with the base plate.

According to an optional embodiment of the invention, it may be structurally favourable if the bearing unit stands on the base plate with a non-rotatable bearing bolt. This increases the stability of the drive device. The bearing bolt can be screwed to the base plate by means of a fastening means, in particular by means of a screw, from a side of the base plate facing away from the coils. In a further embodiment of the invention, at least one ball bearing is arranged between the bearing bolt and the support element. In this way, the support element is rotationally decoupled from the base plate in an advantageous manner and with particularly low friction.

According to a further embodiment, the coils are aligned in the axial direction. In particular, this ensures that the coils, which extend perpendicularly to the axial direction, extend in parallel with the support element with their tops. This has the advantage that the gap can be designed to be particularly small.

According to a preferred embodiment, the printed circuit board and/or the coils and/or the base plate are cast with a potting compound. According to a further preferred embodiment, the potting compound has a high thermal conductivity. By potting the printed circuit board, the coils and the base plate, explosion protection is achieved for the drive device because the components cannot be moved against one another even in the event of severe vibrations. In addition, the use of a thermally conductive potting compound results in good thermal contact between the printed circuit board or the coils and the base plate. In this way, the drive device can be cooled easily. This results in the further advantage that the drive device can be operated with a high electrical power in order to achieve particularly high torques without the individual components overheating. In addition, because all of the electronic components of the drive device are encapsulated, they can be replaced in a service-friendly manner. According to a further embodiment, the base plate may have a thermally conductive material.

The invention further relates to a spin window having a drive device according to any of the preceding claims, the invention providing that a pane is arranged on the rotor unit. A spin window equipped with the drive device according to the invention has a low overall height. The pane may preferably be circular and is arranged on the side of the spin window that is exposed to precipitation. In a further preferred embodiment, the pane is provided on this side with a coating and/or overlay that is shock-resistant and/or scratch-resistant. The pane can be provided with a transparent coating made of ceramic. This has the advantage that the pane can be made from a less resistant material, such that the overall mass of the pane can be reduced. This results in an increased cleaning effect for the spin window with the same motor power. Likewise, due to the mass savings in the case of the pane, the drive device may be dimensioned correspondingly smaller, which is favourable with regard to the overall height and with regard to the covering of the viewing region by the drive device.

On the side facing away from the precipitation, the spin window may have another pane that is rigid. This further pane is attached to the side facing the viewer and may consist of a laminated safety glass or a tempered safety glass or a transparent ceramic or a glass that is optionally coated with such a transparent ceramic. The second pane advantageously protects a viewer of the spin window from the rotatable pane. In addition, the security of the spin window is increased by providing a second pane.

A corresponding design of the spin window advantageously achieves a low overall height of the spin window. The overall height of the spin window may be less than 50 mm, less than 40 mm in a further embodiment and less than 32 mm in another embodiment. By designing the rotating window according to the invention, a visible area of 410 mm$^2$ or more can be achieved, the drive power of the drive device being sufficient to free the pane or spin window from precipitation.

In a further embodiment, the pane is held on the rotor unit between a connecting plate and a cover cap, the connecting plate and the cover cap being connected to the rotor unit. The provision of the connecting plate results in structural advantages, because the pane may be arranged more freely on the rotor unit by means of the connecting plate. In a further embodiment, an annular seal is arranged between the cover cap and the pane. The seal ensures that no precipitation can enter an inner region of the spin window or pass through the spin window.

In another embodiment, the pane has a circumferential collar on its radially outer circumference. The collar ensures that the precipitation on the spin window cannot enter an inner region of the spin window, even along its circumference, or even pass through the spin window. In an optional further embodiment, the collar has a radially circumferential guide groove that protrudes in an axial direction and that engages with a guide projection of an annular base body of the spin window. The guide groove and the guide projection thus advantageously form a labyrinth seal, which improves the tightness of the spin window. In an advantageous embodiment of the invention, the guide groove and the guide projection may be contact-free. The annular base body of the spin window is mounted, for example, in one of the viewing pane or a machine cover. The annular base body therefore cannot be rotated by the drive device. The annular base body is preferably made of aluminium that is hard anodised. The annular base body is therefore also suitable for use in environments in which chips, in particular metal chips, hit the spin window.

In terms of design, the base plate of the drive device may be optionally arranged on an inner diameter of the annular base body and projects radially inwards into the annular base body. This results in the advantage that the drive device does not protrude from the region of the spin window. In one embodiment, a cover housing projecting towards the annular base body is provided for the base plate of the drive device, the rotor unit of the drive device at least partially protruding through the cover housing. In a further preferred embodiment, the cover housing is made of aluminium that is hard anodised. The invention may be further developed in that a seal is arranged between the base plate and the cover housing. As a result, the elements of the drive device lying between the cover housing and the base plate are protected from any precipitation that may enter this region.

To simplify the connection of the spin window, it may also be advantageous if the annular base body has a passage for a lead to the drive device.

BRIEF DESCRIPTION OF THE SEVERAL VIEWS OF THE DRAWINGS

Further features, details and advantages of the invention will become apparent from the wording of the claims and from the following description of embodiments by way of the drawings, in which:

In the following, similar or identical elements are provided with the same reference signs.

DESCRIPTION OF SPECIFIC EMBODIMENTS OF THE INVENTION

Figure 1:
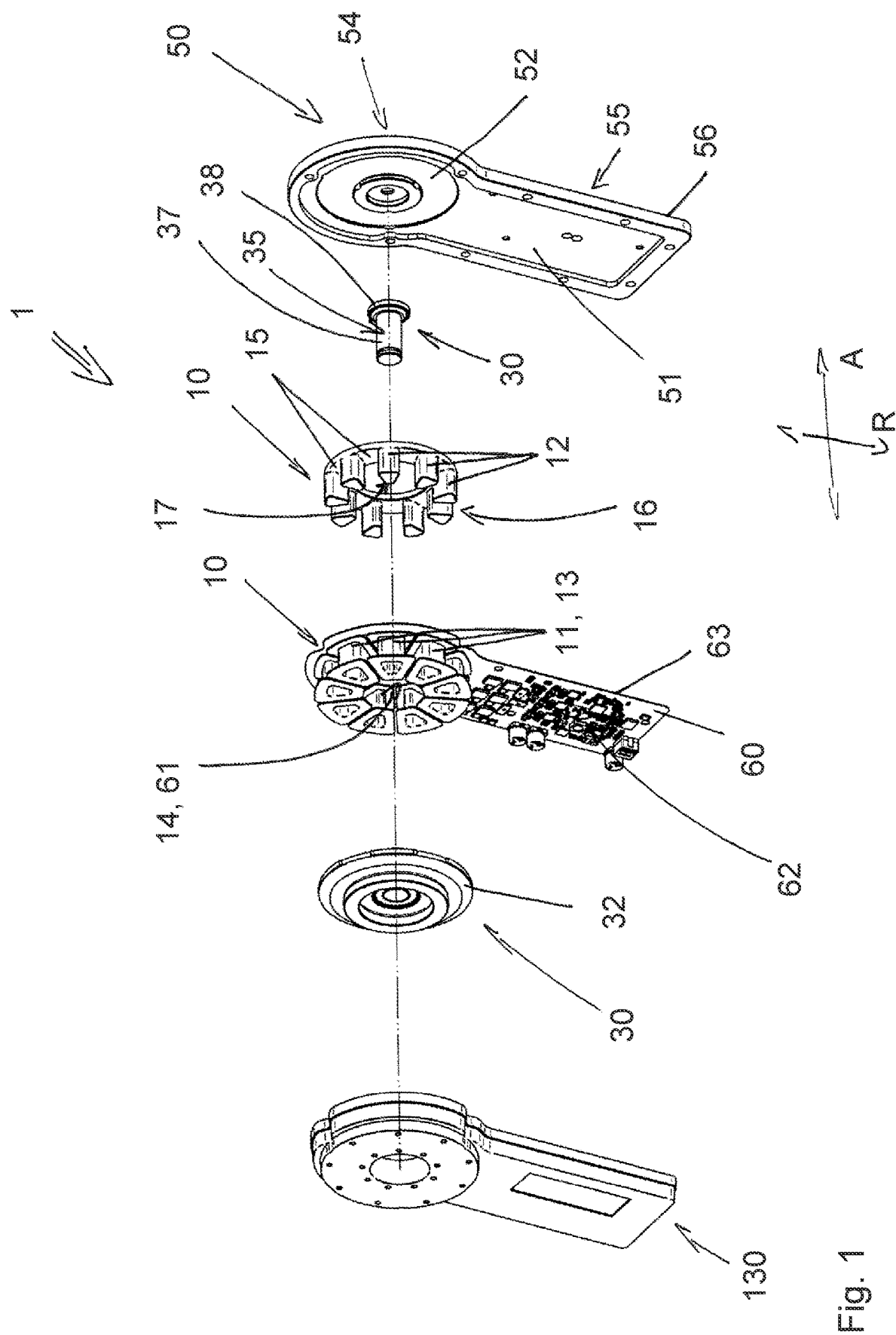
FIG. 1 is a schematic exploded view of the drive device.

FIG. 1 shows the drive device 1 in an exploded view. The drive device 1 is composed of a stator unit 10, a rotor unit 30, a base plate 50 and at least one printed circuit board 60, 60'. The base plate 50 substantially has a keyhole shape having a round portion 54 and a rectangular portion 55. The base plate 50 comprises a thermally conductive material.

The stator unit 10 and the rotor unit 30 are substantially annular. The stator unit 10 has at least three coils 11. The coils 11 are formed from coil cores 12 and coil bobbins 13. The coil cores 12 are pushed into the coil bobbins 13 in an axial direction A. For this purpose, the coil bobbins 13 have recesses 17 that extend in the axial direction A. The coil cores 12 have a shape that tapers inwards in a radial direction R.

The coils 11 are arranged substantially in an annular shape and form a receiving space 14 in the stator unit 10. The coil cores 12 stand on the base plate 50 or lie flat against the base plate 50. The receiving space 14 is concentric with respect to the round portion 54 of the base plate 50 as seen in the radial direction R.

The coil cores 12 are connected via projections 15 and form at least one coil core element 16. In this embodiment, the coil core element 16 is designed as an annular closed ring and has an annular recess in the region of the receiving space 14.

Coil wires are wound around the circumference of the coil bobbins 13. The coil bobbins 13 are at least in part arranged on the printed circuit board 60, 60'.

The printed circuit board 60, 60' is arranged on the base body 50 or lies flat on said base body 50. The printed circuit board 60, 60' has a recess 61 in the region of the receiving space 14, which is formed by the coils 11 of the stator unit 10. The coil cores 12 protrude through the printed circuit board 60, 60' in the region of the recess 61.

The printed circuit board 60, 60' has an open-loop and/or closed-loop control circuit 62. This open-loop and/or closed-loop control circuit 62 is formed by one or more electronic components that are electrically connected to one another by conductor paths introduced into the printed circuit board 60, 60'. The open-loop and/or closed-loop control circuit 62 is used to control and/or regulate the drive device 1. In this case, the open-loop and/or closed-loop control circuit 62 is arranged substantially on a plane with the coil bobbins 13. The open-loop and/or closed-loop control circuit 62 is substantially arranged on the side of the printed circuit board 60, 60' opposite the base plate 50.

The coil bobbins 13 project at least in part beyond the recess 61 of the printed circuit board 60, 60'. The coil bobbins 13 are arranged on the side of the printed circuit board 60, 60' opposite the base plate 50, as seen from the base plate 50. The coil bobbins 13 lie flat on the printed circuit board 60, 60'.

The printed circuit board 60, 60' rests in the base plate 50. For this purpose, the base plate 50 has a recess 51, the circumference of which extends substantially in parallel with the outer circumference 56 of the base plate 50. The printed circuit board 60, 60' has a contour 63 corresponding to the recess 51. In the region in which the coil core element 16 or the coil cores 12 lie, the recess 51 has an annular depression 52 that substantially corresponds to the outer circumference of the coil core element 16.

In an assembled state of the drive device 1, the coil core element 16 is pushed with the coil cores 12 into the coil bobbins 13 such that the coils 11 are formed by the coil cores 12 of the coil core element 16 and the coil bobbins 13. This results in an arrangement in which the coil bobbins 13 are at least in part arranged above the coil core element 16.

The rotor unit 30 has a bearing unit 31. The rotor unit 30 is rotatably supported with respect to the base plate 50 by means of this bearing unit 31. Part of the bearing unit 31 is connected to the base plate 50 in a non-rotatable manner. Another part of the bearing unit 31 is rotatable with respect to the base plate 50. The bearing unit 31 stands on the base plate 50 or lies flat against the base plate 50.

The rotor unit 30 is inserted into the stator unit 10 in the axial direction A. The rotor unit 30 is arranged concentrically with respect to the coils 11 in an axial direction A. Here, the rotor unit 30 protrudes with its bearing unit 31 into the receiving space 14 of the stator unit 10.

The rotor unit 30 has a bearing unit 31 having a support element 32 and a bearing bolt 35.

The bearing bolt 35 of the bearing unit 31 has a shaft part 37 and a contact flange 38. The contact flange 38 is in contact with the base plate 50 and stands centrally in the round portion 54 of the base plate 50. In this central region of the round portion 54 of the base plate 50, the annular depression 52 has an annular recess 53 that encloses the contact flange 38 around the circumference thereof. The bearing bolt 35 stands on the base plate 50 in a non-rotatable manner and is connected to the base plate 50 by means of a fastening means, such as a screw.

When viewed from the base plate 50, the shaft part 37 of the bearing bolt 35 lies above the annular recess 53. The top of the annular recess 53 is substantially in a plane with the top of the printed circuit board 60, 60' such that the coil bobbins 13 rest on the one hand on the printed circuit board 60, 60' and also on the top of the annular recess 53.

The support element 32 of the bearing unit 31 has a contact region 33 that extends in a radial direction R. The contact region 33 is located on the side of the coils 11 opposite the base plate 50 and extends over the coils 11. The contact region 33 is spaced apart from the coils 11 and is not in contact with the coils 11. Permanent magnets 34 are arranged on the support element 32 of the bearing unit 31 and in particular on the contact region 33, which extends radially to the coils 11. Said permanent magnets 34 rest at least in part in the support element 32 or on the support element 32. In case of resting of the permanent magnets 34, the support element 32 has corresponding recesses for this purpose. The permanent magnets 34 have a conical shape that tapers radially inwards.

A gap S is formed in the axial direction A between the contact region 33 or the permanent magnets 34 and the coils 11.

At least one ball bearing 36 is arranged between the bearing bolt 35 and the support element 32. The support element 35 has a flange portion 39 extending in the axial direction A. When viewed in the radial direction R, the ball bearings 36 are arranged between the shaft part 37 of the bearing bolt 35 and the flange portion 39 of the support element 32. In this way, the support element 32 is decoupled from the bearing bolt 35.

Figure 2:
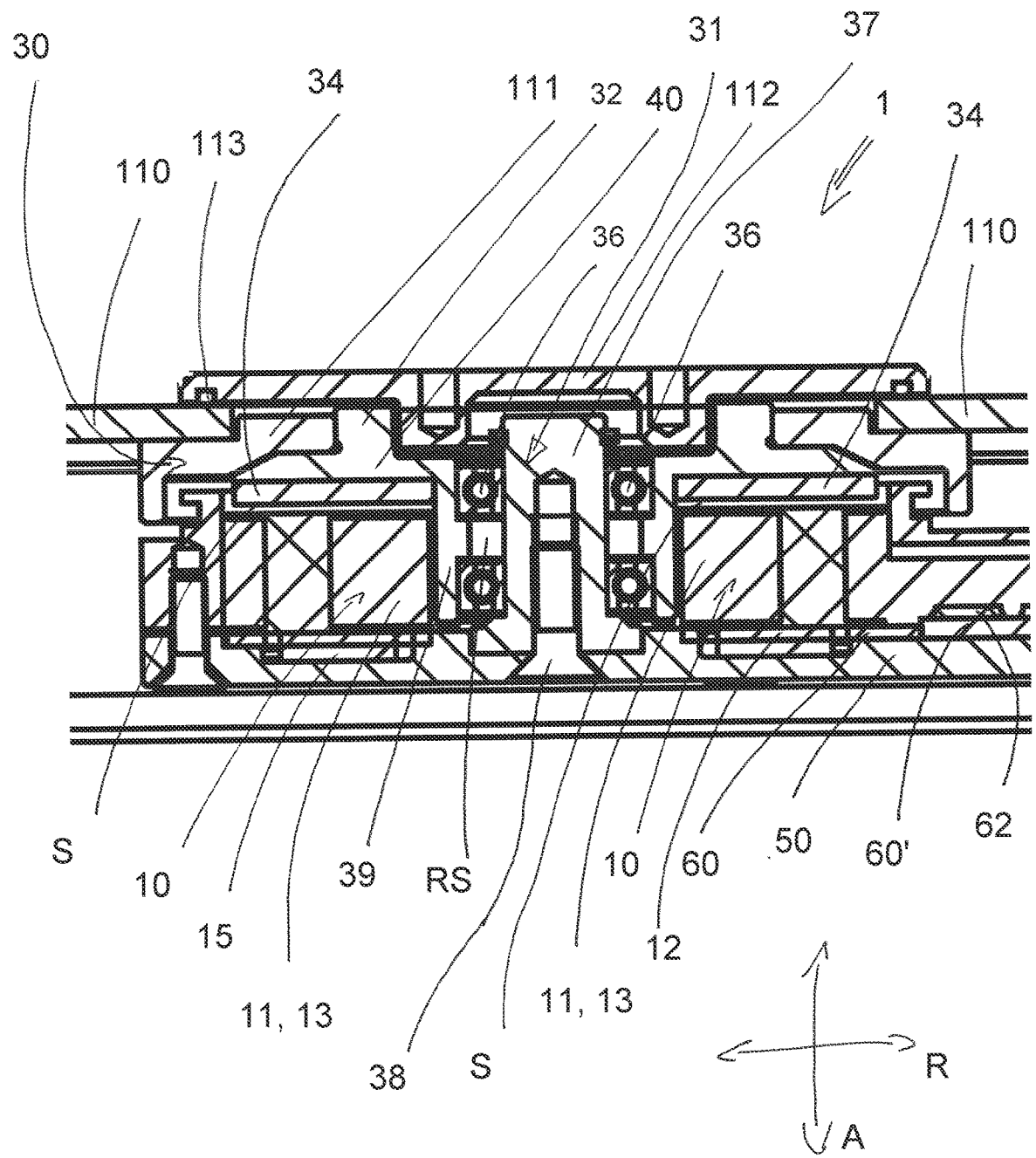
FIG. 2 is a schematic sectional view of the drive device in a spin window.

FIG. 2 is a sectional view through a further embodiment of the drive device 1, the open-loop and/or closed-loop control circuit 62 being arranged on a further printed circuit board 60' and the coil bobbins 13 being arranged on the printed circuit board 60 that is separate from the further printed circuit board 60'. In the embodiment according to FIG. 1, a one-piece printed circuit board 60 is provided for the open-loon and/or closed-loop control circuit 62 and for the coils 11 or coil bobbins 13.

The further printed circuit board 60' rests in the part of the recess 51 of the base plate 50 that is in the rectangular portion 55 of the base plate 50. The printed circuit board 60 rests in that part of the recess 51 of the base plate 50 that is in the round portion 54 of the base plate 50.

Otherwise, the embodiment of the drive device 1 shown in FIG. 2 corresponds to the embodiment shown in FIG. 1.

The coil core element 16 is located in the recess 51 of the base plate 50. The coil cores 12 extend away from the base plate 50 in the axial direction A. The bearing bolt 35 rests with its contact flange 38 in the annular depression 52 in the central region of the round portion 54 of the base plate 50. In FIG. 2 it can be seen very clearly that the part of the flange portion 38 of the bearing bolt 35 opposite the base plate 50, the sides of the projections 15 opposite the base plate 50, and the side of the printed circuit board 60 opposite the base plate 50 lie on a plane together with the top of the annular recess 53. The coil bobbins 13 stand on the top of the printed circuit board 60, the top of the projections 15 and the top of the annular recess 53.

Furthermore, it can be seen very clearly in FIG. 2 that, when viewed from the inside in the radial direction R, the shaft part 37 of the bearing bolt 35 is surrounded by the ball bearings 36. The ball bearings 36 are in turn surrounded by the flange portion 39 of the support element. The bearing bolt 35 is screwed to the base plate 50 by a fastening means, in this case a screw, and is thus fixed in a non-rotatable manner.

The support element 32 is decoupled from the base plate 50 by the ball bearings 36, as a result of which the bearing unit 31 or the rotor unit 30 may be rotated.

In addition, it can be clearly seen in FIG. 2 that the permanent magnets 34 are arranged in a part of the support element 32 extending in the radial direction R. The permanent magnets 34 are arranged substantially in parallel with the base plate 50, the printed circuit board 60, the projections 15, and the top of the coil bobbins 13 or the coils 11.

A gap S is arranged between the top of the coils 11, i.e. the side of the coils 11 that faces away from the base plate 50, and the permanent magnet 34 or the support element 32.

Similarly, an annular gap RS is arranged between the coils 11 and the flange portion 39 of the support element 32 in the radial direction R. As a result, the rigid stator unit 10 connected to the base plate 50 is completely rotationally decoupled from the rotor unit 30, which is rotatable in the circumferential direction.

In FIG. 2, the assembly of the drive device can also be seen in the region of the rotor unit 30 and the stator unit 10.

The coil cores 12 are connected to the coil core element 16 by the projections 15. This coil core element 16 rests in the base body 50. The top of the projections 15 and the top of the printed circuit board 60 lie substantially on a plane with the top of the annular recess 53, which cannot be seen in FIG. 3. The coil bobbins 13 stand on this plane between the printed circuit board 60, projections 15 and the annular recess 53.

Furthermore, FIG. 2 shows the support element 32 with the permanent magnets 34 at least in part resting therein. The permanent magnets 34 are substantially parallel to the plane of the printed circuit board 60 or the projections 15.

The support element 32 or the rotor device 30 is rotatable in its circumferential direction and is rotationally decoupled from the base plate 50 by means of the bearing bolt 35, which is connected non-rotatably to the base plate 50, and the ball bearings 36.

In all embodiments, the printed circuit board 60, 60', the coils 11 and the base plate 50 may be potted with a potting compound 70 (not shown in the drawings). The potting compound 70 has a high thermal conductivity.

Figure 3:
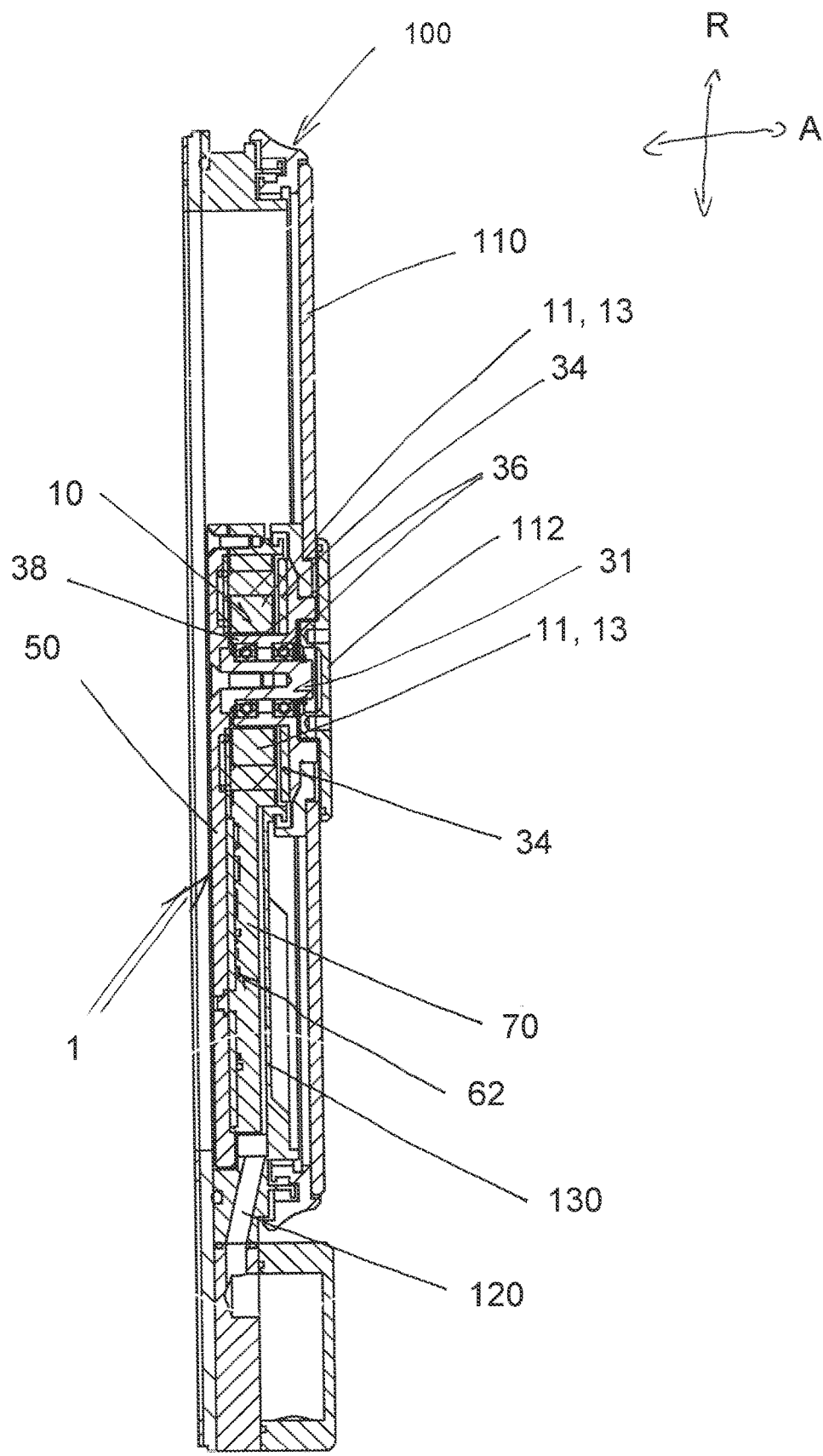
FIG. 3 is a schematic sectional view of the spin window.
Figure 4:
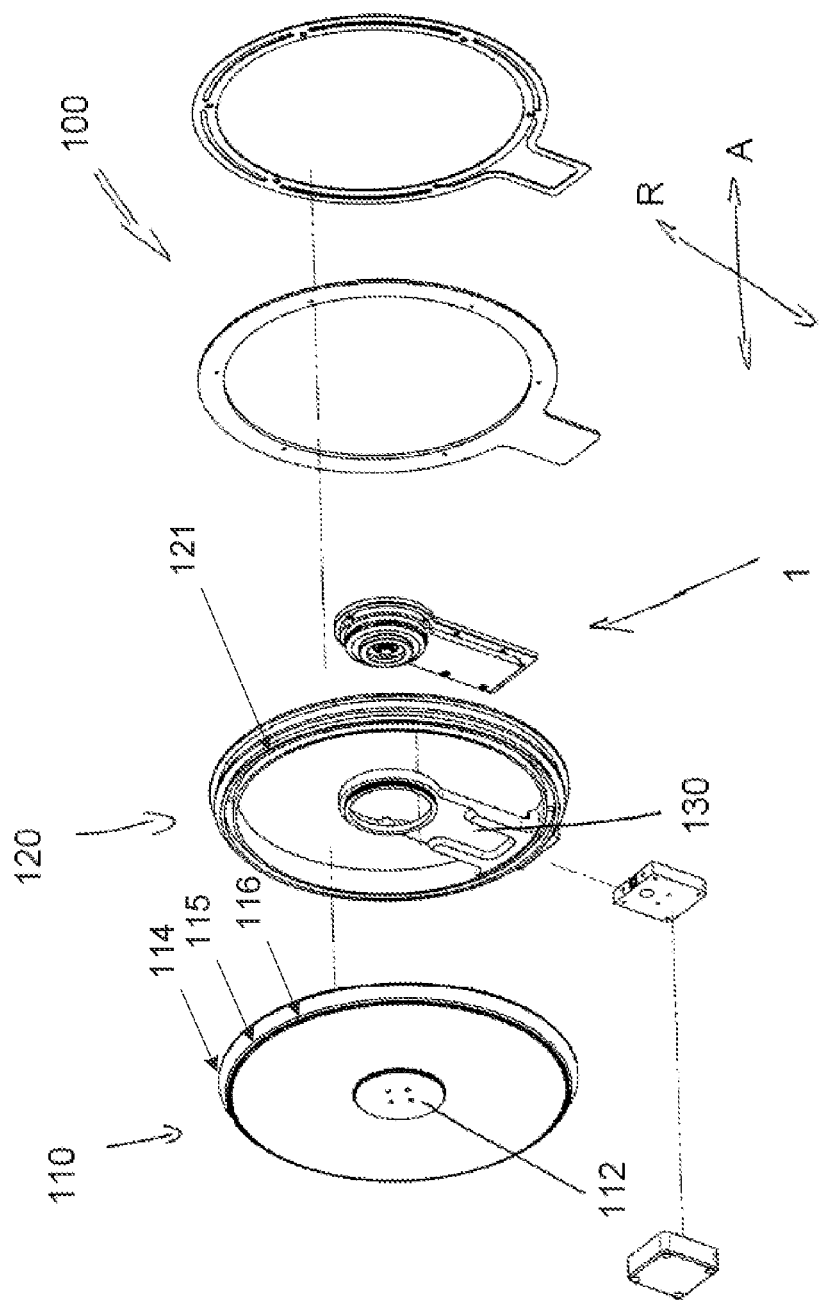
FIG. 4 is a schematic exploded view of the spin window.

An embodiment of the spin window 100 is shown in FIGS. 3 and 4.

FIG. 3 is a sectional view of the spin window 100 having the drive unit 1 according to one of the embodiments described above. FIG. 4 is an exploded view of the spin window 100 according to one of the embodiments described above. With regard to the spin window 100 described below, reference is made to FIG. 4. A pane 110 is arranged on the rotor unit 30 of the drive unit 1. The pane 110 is substantially circular.

The pane 110 is held on the rotor unit 30 between a connecting plate 111 and a cover cap 112, the connecting plate 111 and the cover cap 112 being connected to the rotor unit 30, in particular to the support element 32 of the rotor unit. An annular seal 113 is arranged between the cover cap 112 and the pane 110.

The pane 110 is made of a transparent material, for example a transparent plastics material or glass, laminated safety glass or tempered safety glass in particular being suitable as glass. The pane 110 may also be constructed in two layers. For example, the pane 110 has a support on the side facing away from the base plate 50. The support may, for example, be a layer of a scratch- and impact-resistant transparent ceramic. The support may in particular be connected to the pane 110 by means of a bonding layer. A lamination layer, with which the support is laminated onto the pane 110, comes into consideration as the bonding layer. Alternatively, the pane 110 can be coated on the side facing away from the base plate 50 with a coating that is, for example, scratch and impact resistant.

The pane 110 has a circumferential collar 115 on its outer circumference 114 located in the radial direction R. The collar 115 has a radially circumferential guide groove 116 projecting in the axial direction A that engages with a guide projection 121 of an annular base body 120 of the spin window 100. The guide groove 116 has no contact with the guide projection of the base body.

The connecting plate 111 is L-shaped in cross section. The short side of the L-shaped cross section surrounds the coils 11 in the axial direction A with respect to the printed circuit board 60, 60'. The connecting plate 111 is arranged with the long side of the L-shaped cross section between the support element 32 and the pane 110 or between the support element 32 and the cover cap 112. The connecting plate is therefore adjacent both to the cover cap 112 and to the pane 110 in the axial direction A. When viewed in a radial direction R, the connecting plate 111 rests on the inside of a contact recess 40 of the support element 32 and is arranged in the radial direction R between said contact recess 40 of the support element 32 and the pane 110. This results in the connecting plate 111 being stepped in the axial direction A in the region of the contact between the pane 110 and the printed circuit board 60, 60'.

The cover cap 112 has a diameter that corresponds at least to the diameter of the rotor unit 30 or the stator unit 10. In an outer region of the radius of the cover cap 112, a continuous annular groove running in the circumferential direction is provided in which the annular seal 113 rests. The cover cap 112 rests on the pane 110. The cover cap 112 and the pane 110 are arranged concentrically with respect to the rotor unit 30 and the stator unit 10. The pane 110 is clamped between the cover cap 112 and the connecting plate or the support element.

The base plate 50 of the drive device 1 is arranged on the inner diameter 122 of an annular base body 120 and projects radially inward into the annular base body 120. For the base plate 50 of the drive device 1, a cover housing 130 protruding towards the annular base body 120 is provided, the rotor unit 30 of the drive device 1 at least in part protruding through the cover housing 130. The annular base body 120 has a passage 123 for a lead 80 of the drive device 1.

A cover housing 130 protrudes in the axial direction into the short portion of the L-shaped connecting plate 111. A seal 131 is arranged between the base plate 50 and the cover housing 130. The cover housing 130 encloses the printed circuit board 60, 60' and the stator unit 10 at least in part on the side facing away from the base plate 50. In addition, the printed circuit board 60, 60' and the open-loop and/or closed-loop control circuits 62 arranged thereon and the elements of the stator unit 10 may be encapsulated with the potting compound 70.

The invention is not restricted to one of the embodiments described above, but may be modified in many ways.

All of the features and advantages arising from the claims, the description and the drawing, including structural details, spatial arrangements and method steps, may be essential to the invention both individually and in a wide variety of combinations 5.

1 Drive device
10 Stator unit
11 Coils
12 Coil cores
13 Coil bobbins
14 Receiving space
15 Projections
16 Coil core element
17 Recess
30 Rotor unit
31 Bearing unit
32 Support element
33 Contact region
34 Permanent magnets
35 Bearing bolt
36 Ball bearing
37 Shaft part
38 Contact flange
39 Flange portion 40 Contact recess
50 Base plate
51 Recess
52 Annular depression
53 Annular recess
54 Round portion
55 Rectangular portion
56 Outer circumference
60 Printed circuit board
61 Recess
62 Open-loop and/or closed-loop control circuit
63 Contour
60 Further printer circuit board
70 Potting compound
80 Lead
100 Spin window
110 Pane
111 Connecting plate
112 Cover cap
113 Annular seal
114 Circumference
115 Collar
116 Guide groove
120 Base body
121 Guide projection
122 Inner diameter
123 Passage
130 Cover housing
131 Seal
A Axial direction
R Radial direction
S Gap
RS Annular gap

What is claimed is:

1. A spin window (100) comprising:
   a pane:
      a drive device (1) adapted to rotate the pane and comprising:
         an annular stator unit (10),
         an annular rotor unit (30), and
         a base plate (50),
      wherein the pane is held by the rotor unit (30);
      wherein the annular stator unit (10) comprises at least three coils (11) having coil cores (12) and having coil bobbins (13);
      wherein the annular rotor unit (30) comprises a bearing unit (31), wherein the coils (11) are forming a receiving space (14) in the annular stator unit (10), characterised in that the coil cores (12) and the bearing unit (31) stand on the base plate (50),
      wherein the coil bobbins (13) are at least in part arranged on a printed circuit board (60), the printed circuit board (60) resting on the base plate (50) and having a recess (61).

2. The spin window (100) according to claim 1, wherein the rotor unit (30) is arranged concentrically with respect to the coils (11) in an axial direction (A) and protrudes with the bearing unit (31) at least in part into the receiving space (14).

3. The spin window (100) according to claim 1, wherein the coil cores (12) are connected in the region of the recess (61) via projections (15) and form at least one coil core element (16).

4. The spin window (100) according to claim 1, wherein the pane (110) is held on the rotor unit (30) between a connecting plate (111) and a cover cap (112), the connecting plate (111) and the cover cap (112) being connected to the rotor unit (30).

5. The spin window (100) according to claim 1, wherein the printed circuit board (60) has an open-loop and/or closed-loop control circuit (62).

6. The spin window (100) according to claim 5, wherein the coil bobbins (13) and the open-loop and/or closed-loop control circuit (62) are arranged substantially on one plane.

7. The spin window (100) according to claim 1, wherein the bearing unit (31) has a support element (32) which has a contact region that extends at least in part over the coils (11) in the radial direction (R) on a side of the coils (11) opposite the base plate (50), at least three permanent magnets (34) being arranged on the support element (32), the permanent magnets (34) being in the shape of a circular ring segment.

8. The spin window (100) according to claim 7, wherein a gap (S) is formed between the contact region and the coils (11) in the axial direction (A).

9. The spin window (100) according to claim 1, wherein the printed circuit board (60), the coils (11) and the base plate (50) are potted with a potting compound (70).

10. The spin window (100) according to claim 1, wherein the pane (110) has a circumferential collar (115) on an outer circumference (114) of the pane.

11. The in window (100) according to claim 10, wherein the circumferential collar has a radially circumferential guide groove (116) projecting in an axial direction (A), in which guide groove is engaged with a guide projection (121) of an annular base body (120) of the spin window (100), the guide groove and the guide projection being contact-free.

12. The spin window (100) according to claim 11, wherein base plate (50) of the drive device (1) is arranged on an inner diameter of the annular base body (120) and protrudes radially inward into the annular base body (120).

13. The spin window (100) according to claim 11, characterised in that a cover housing (130) projecting towards the annular base body (120) is provided for the base plate (50) of the drive device (1), the rotor unit (30) of the drive device (1) at least in part protruding through the cover housing (130).

* * * * *